United States Patent [19]
Chekroun

[11] Patent Number: 5,635,939
[45] Date of Patent: Jun. 3, 1997

[54] DEVICE AND METHOD OF USING AN AUXILIARY ANTENNA OUTFITTED WITH AN ADAPTIVE SPACE FILTER FOR ANTI-JAMMING A MAJOR ASSOCIATED ANTENNA

[75] Inventor: Claude Chekroun, Gif sur Yvette, France

[73] Assignee: Contre Mesure Hyperfrequence, Les Ulis Cedex, France

[21] Appl. No.: 718,963

[22] Filed: Jan. 18, 1985

[30] Foreign Application Priority Data

Jan. 23, 1984 [FR] France ..................... 84 00997

[51] Int. Cl.$^6$ ..................... G01S 3/16; G01S 3/28
[52] U.S. Cl. ..................... 342/384; 342/381
[58] Field of Search ..................... 343/754, 756, 343/909, 381, 384; 342/381, 384

[56] References Cited

U.S. PATENT DOCUMENTS

| 4,344,077 | 8/1982 | Chekroun et al. | 343/909 |
| 4,439,770 | 3/1984 | Lewis et al. | 343/381 |

*Primary Examiner*—Theodore M. Blum
*Attorney, Agent, or Firm*—Pollock, Vande Sande & Priddy

[57] ABSTRACT

The invention pertains to the sensing and elimination of jamming signals transmitted by jammers towards radar antennas. According to the invention, we associate with a main space surveillance radar antenna an auxiliary antenna that is outfitted with a modulating filter which enables the sensing of jammers, and the elimination of jamming effects by opposing, to the secondary lobes of the main antenna corresponding to the jamming directions, corresponding secondary lobes which are appropriately amplified by the auxiliary antenna. The invention applies to anti-jamming of radar antennas with mechanical or electronic sweeps.

6 Claims, 3 Drawing Sheets

DEVICE AND METHOD OF USING AN AUXILIARY ANTENNA OUTFITTED WITH AN ADAPTIVE SPACE FILTER FOR ANTI-JAMMING A MAJOR ASSOCIATED ANTENNA

BACKGROUND OF THE INVENTION

We described in French patent No. 79 02918 of Feb. 5, 1979, (i.e., U.S. Pat. No. 4,344,077) a method which makes it possible to eliminate the jamming activities of jammers that transmit towards a radar antenna which aim direction is shifted in relation to the straight line that connects the antenna to the jammer. This method rested on the fact that by using an appropriate make-up filter and conveniently placed in front of the antenna, we could modify the amplitude of the antenna radiation pattern secondary lobes especially by generating "dips" that we could shift in angular fashion according to the aim direction of the antenna. By making the orientation of the pattern dips coincide with the transmitting direction of the jammer (in relation to the antenna), we could thus eliminate the jamming effect.

The same patent describes a method that makes it possible consequently to sense the position of a jammer by assessing the point at which jamming no longer represents any significant problem. Such a search by "negative effect" is fairly delicate and not very accurate, especially in view of the residual noise level of the antenna.

In the patent application No. 81 18674 (U.S. Pat. No. 4,518,966) of Oct. 5, 1981, we described a filter that allows the generalization of inhibitive activity against jammers for any hyperfrequency antenna with any polarization direction, whereas in the above mentioned patent No. 79 02918, attenuation was only possible to the extent that the hyperfrequency antenna would transmit a linearly polarized wave. In the most recent patent application, there was no description for a specific method to search and assess the position of a jammer, being referred for this search to the "negative effect" procedure that was envisioned in the previous application.

SUMMARY OF THE PRESENT INVENTION

The purpose of the invention is to improve and facilitate the search and assessment of the position of a jammer which transmits towards a radar antenna outfitted with a filter as described in one or the other above mentioned patents.

The method of the invention is characterized in that the antenna with a filter in front of it comprised of at least one network of conductive wires loaded with diodes which are appropriately arranged and distributed, thus allowing through modulation of currents which travel through said wires to obtain a modulation in response to the amplitude of the antenna radiation pattern secondary lobes. We perform said modulation so as to shift at least an overintensification or a "hump" for instance by increasing by at least 10 or 15 dB the level of one secondary lobe that is angularly distant of angle $\theta$ in relation to the aim direction of the antenna; we assess and note at all times the value of angle $\theta$ which is a function of the modulation of currents that is applied to the network; we note and assess the noise level picked up by the antenna for each value of angle $\theta$; and we deduce the direction of jammers from the picked up peak noise levels.

Such a "positive effect" search displays numerous advantages in relation to the "negative effect" search which was envisioned earlier.

By creating an amplitude "bulge" that can be shifted on either side of the aim direction of the antenna, we raise with no difficulty the noise level from 10 to at least 15 dB for at least one secondary lobe of the network which can be shifted. When the position of that lobe corresponds to the angular direction $\theta$ of the jammer, the noise that is picked up by the antenna increases substantially and very markedly above the background noise of the antenna. The assessment of that position can thus be performed very easily and quickly (in about several hundred nanoseconds). The exact angular assessment of the lobe will be improved if the antenna, to which the system is associated, has a directional error path which will allow even faster and more accurate localization of the jammer direction.

Obviously, once the direction of the jammer is assessed, in order to eliminate its effect, we simply have to control the "dip" from the pattern as described in the previous patents at the exact location of the assessed $\theta$ angle.

The invention also pertains in a basic way to the application of the method for searching and assessing the position of a jammer which transmits towards a radar antenna as stated above in order to eliminate the jamming effect on a second antenna that is associated to the first one. According to the invention, the elimination of the jamming effect is obtained by applying, at the level of the pick-up circuit of the second radar antenna, radio-electric pick-up signals generated by the first antenna and modulated by said filter so as to cancel in a substantial way within the pick-up pattern of the second antenna the secondary lobes which correspond to the positioning $\theta$ angle of the jammer, which is determined by the first antenna.

With such a procedure, many advantages emerge, and especially the following:

a) it becomes possible to dissociate the jammer search and assessment antenna from the surveillance antenna proper. Furthermore, the search and assessment antenna can look like a small auxiliary antenna which is outfitted with the above mentioned modulating filter, while the main antenna can be any known mechanical or electric sweep antenna which does not need to be outfitted with a modulating filter. Therefore we gain through simplicity savings in the assembly, in reliability and in efficiency. In particular, since the main antenna does not receive a modulating filter in front of it, at that level there is no insertion loss. Furthermore, the main surveillance antenna is discharged from the jammer search and assessment procedure, which makes it possible to use all of its power for the surveillance that is assigned to it.

b) because of the procedure for adding the second antenna at the level of the pick-up circuit, signals generated by the first antenna allowing for direct opposition of secondary lobes from the main antenna pattern and the auxiliary antenna pattern, it is possible, in the event of the presence of several jammers which transmit in various directions, to repeat and add, independently from one another, the elimination operations for secondary lobes of the main antenna pattern in the established directions of the jammers and to cancel or reduce their effects. This independence in elimination procedures for several distinct jammers seems completely novel within the method and resolves elegantly a very arduous problem.

c) it is quite possible to associate a circular polarized auxiliary antenna to a rectilinear polarized main antenna, which will make it possible to restore the polarizing deficiencies of the main antenna.

In order to implement the invention, we will use a device which is mainly comprised of:

an initial auxiliary radar antenna equipped with a modulating filter (thus allowing for jammer search and assessment);

a second main radar antenna (performing surveillance over the area);

an adding device, allowing for addition, at the level of the signals picked up by the main antenna, of modulated pick-up signals generated or produced by the auxiliary antenna.

The invention and its implementation will be more clear with the description that follows which is in reference to the attached drawings wherein:

DETAILED DESCRIPTION OF THE INVENTION

Figure 1:
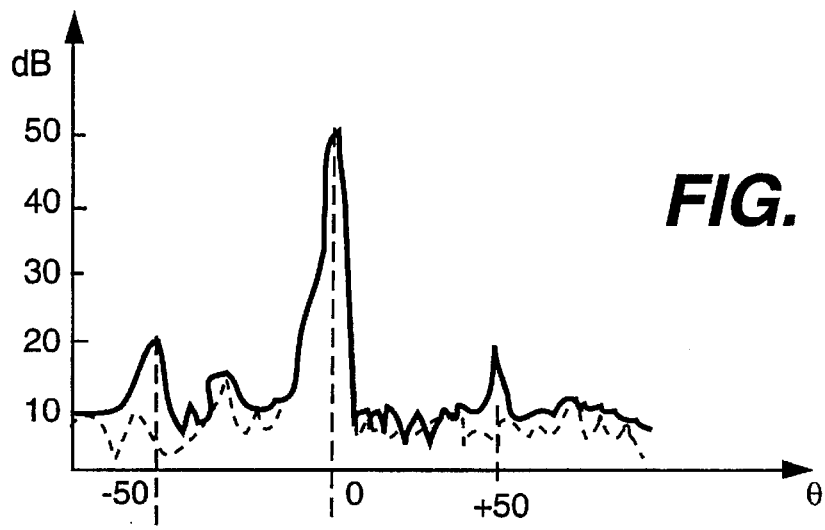
FIG. 1 displays the illumination pattern of an antenna in which the intensity of the signal picked up by the antenna shows up at the ordinates, which is measured in decibels, in relation to the considered angle that is measured at the abscissas on either side of the aiming axis of the antenna.
Figure 2:
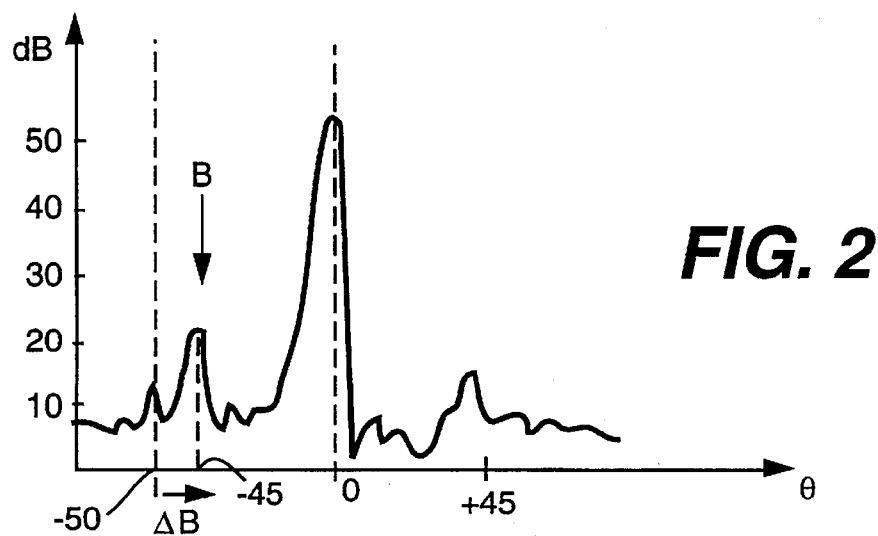
FIG. 2 is a pattern that is analogous to that of FIG. 1 which displays the distortion of the pattern in a jammer tracking procedure.

First of all we will refer to FIGS. 1 and 2 in order to describe the search and assessment procedure in an application example which makes use of a filter that is placed in front of the antenna and that is comprised of conductive wires loaded with diodes, as described in the previously mentioned patent No. 79 02918.

The filter, which does not belong to this invention, will not be described anew, since we are reminded that it is basically comprised of a network of wires loaded with diodes or "diode-wires" which are appropriately controlled through modulated electric currents thus enabling the modulation on pick-up of the antenna secondary lobes. More accurately, we must recall, by referring first of all to FIG. 1, that when the filter is fed with strong currents, which are all equal, of about ten or so milliamps for instance, the radiation pattern of the antenna is no longer perturbed, and the installing of the filter only triggers a slight attenuation of the signal. With the dotted line, in FIG. 1, we illustrated that pattern, wherein we applied at the ordinates the amplitudes measured in decibels of the various lobes, and at the abscissas, the angles, and the main lobe is presumed to be aimed at angle θ=0. As described in the above mentioned patents, the filter is controlled with strong currents when the signal is transmitted. On the other hand, during pick-up periods, the filter is controlled with modulated currents, each wire of the network being traveled by a current with a specific intensity that ranges from several microamps to several milliamps, thus disturbing the curve, basically at the level of the antenna secondary lobes which are distorted as shown by the full line curve. The main lobe is not seemingly affected at the scale of the drawings.

We observe on the continuous line curve of FIG. 1, that we have now two very clear "bulges" or overintensifications of secondary lobes for angles θ that are equal to −50 degrees and +50 degrees respectively. In conformance with the invention, and contrary to what we did in the previous patents, we perform a very powerful modulation of the amplitude, in order to obtain an increase of at least 10 to 15 dB of some of the secondary lobes. Through appropriate modulation of that amplitude modulation for the currents, we can shift the "bulges". Thus, in FIG. 2, we see that we shifted the "bulge" that is located at −50 degrees towards angle −45 degrees. If a jammer B is located in that direction, the fairly high level of the "bulge" will provide a very powerful jamming signal which will make it possible to assess the value of the considered angle θ, which is known, since it directly depends on the known modulation law which is applied to the filter.

It should be stated that all these operations can be performed in several hundred nanoseconds. In other words, sensing the jammer can take place almost instantly. Furthermore, this operation can be repeated as many times as we want in order to determine the probable positioning of other jammers. As stated earlier, the exact angular determination of the lobe is already improved if the antenna to which the system is associated has a directional error path which allows for even more rapid and accurate localization of the jammer direction.

Figure 3:
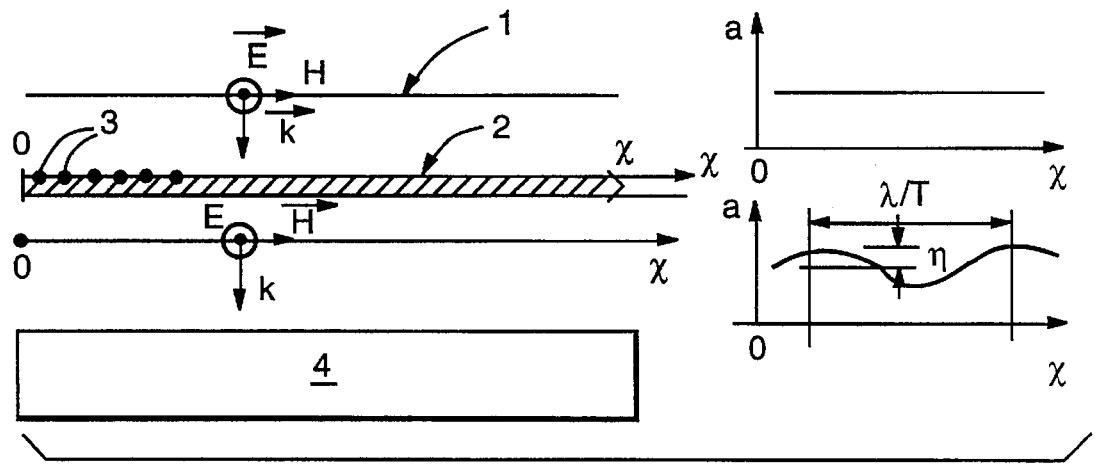
FIG. 3 explains schematically a preferred modulation procedure for the secondary lobes of the antenna pattern with regard to jammer search.

By referring to FIG. 3, we will describe in detailed fashion a preferred modulation procedure for the currents.

In FIG. 3, we schematically depicted as 1 an incident wave plane of which we concentrate the vector $\vec{E}$ (electric field) at one point, the vector $\vec{H}$ (magnetic field) and the propagation direction $\vec{k}$. To the right on the same figure, we depicted the amplitude a (constant) of the signal alongside the direction x which is parallel to the plane of the wave.

At 2, we depicted the modulating filter of the invention which is basically comprised, as briefly stated above, of wire-diodes like 3, stretched forward and parallel to the pick-up antenna 4.

We apply to that filter a sinusoidal modulation of currents with periods equal to λ/T and with an amplitude η, and the modulation is written as follows:

$$an(1 - \eta + \eta \cos \omega t) \quad (1)$$

with:

$$\sin \theta = \frac{\lambda}{T} \quad (2)$$

$$\omega = \frac{2\pi}{T} \quad (3)$$

λ being the wave length that corresponds to one of the operating frequencies of the antenna 4 to which the filter 2 is associated.

When we want to explore the various directions in space, we simply have to vary the period λ/T of the curve.

Figure 4:
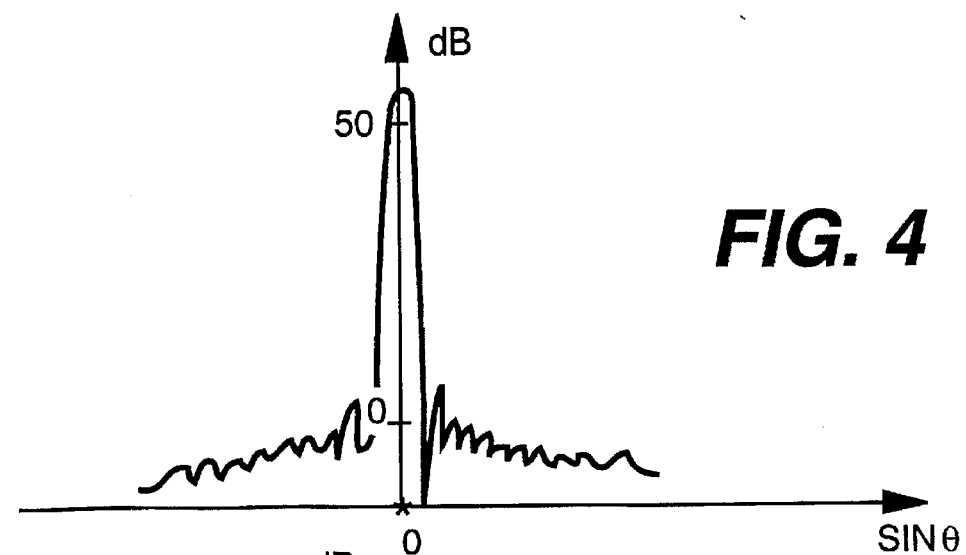
FIG. 4 displays the pick-up pattern of an antenna that is outfitted with a filter when that filter is passive.

By referring to FIG. 4, we notice that the pick-up pattern of the antenna is without distortion, since the filter 2 is presumably passive, or the diode-wires 3 are traveled by strong equal currents (several milliamps).

Figure 5:
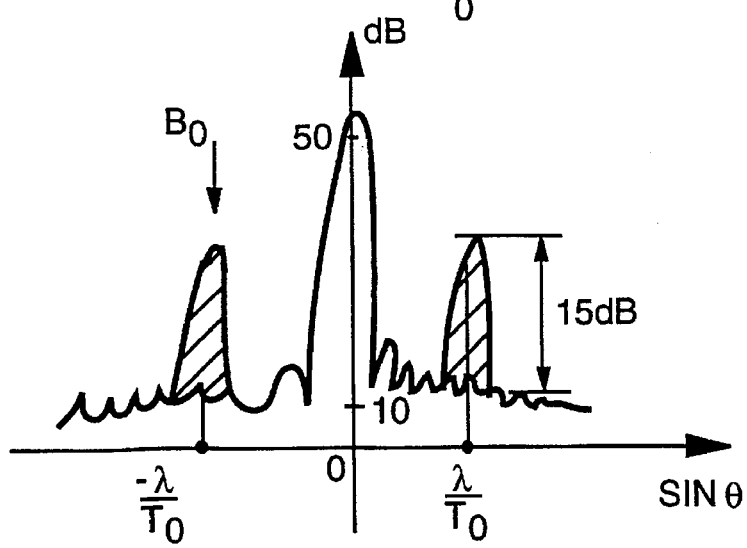
FIG. 5 displays the same pattern as that of FIG. 4 but in which the filter is active.

In FIG. 5, we notice the same pick-up pattern of the antenna when the filter is active and we have adopted a modulation period λ/To which determines the direction θo (according to the formula sin θo=λ/To) wherein on either side of the main direction there is peak overintensification of the secondary lobes.

Through strong modulation of the amplitude, or the selection of currents crossing the wires and modulated in sinusoidal fashion according to relatively significant intensities, we manage to raise the level of the secondary lobes in the concerned direction by at least 10 to 15 decibels without producing sizeable disruptions on the remainder of the pattern.

As stated above in describing the function of FIGS. 1 and 2, if a jammer Bo is located in direction θo, it is immediately sensed by the substantial increase in noise picked up on the antenna. Known analytical methods make it also possible to determine whether the direction of the jammer is at −θo or at +θo and they will not be described.

Figure 6:
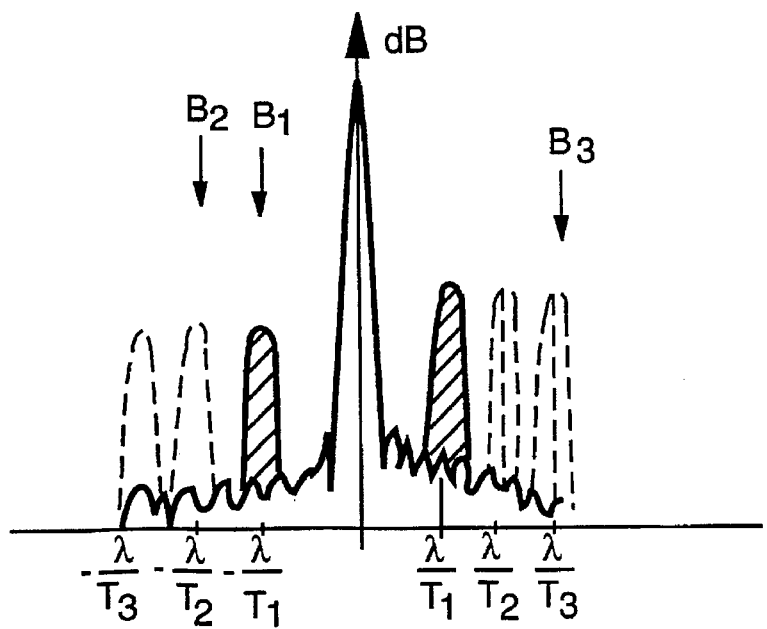
FIG. 6 illustrates as in FIG. 5 the shift of the overintensification bulge in relation to the modulation which is applied to the filter.

The same procedure can obviously be repeated several times and it can therefore make it possible to sense several jammers like B1, B2 and B3 as schematically shown in FIG. 6 and corresponding to overintensifications obtained from periods λ/T1, λ/T2, λ/T3. As previously stated, the flexibility of the method is such that pinpointing and defining several jammers only requires several hundred nanoseconds, such sensing being almost instant.

Figure 7:
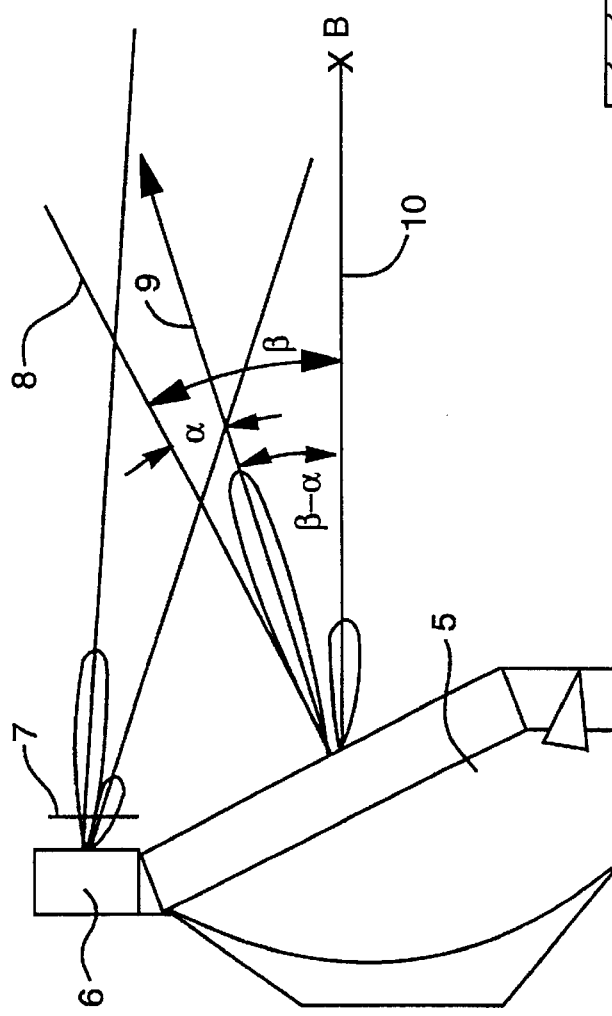
FIG. 7 display schematically an application of the invention for the search and assessment of jammers and the elimination of their effect at the level of an associated surveillance antenna.

In reference to FIG. 7, we illustrated an especially preferred application wherein we associate with a main radar surveillance antenna 5, an auxiliary sensing antenna 6 which is outfitted with a modulating panel 7 that enables the sensing and assessment of jammers as stated above.

In FIG. 7, we show at 8 the mechanical axis of the antenna 5 which we presumed to be of the electronic sweep type of which the beam is shown at 9 and off by an angle α in relation to the axis 8. We presume that a jammer B is located in front of the antenna in a direction that is shown at 10 and forming an angle β with axis 8.

The auxiliary antenna 6 which is outfitted with the modulating panel 7 ensures almost instant sensing of the direction of the jammer, or of angle β. This determination is performed according to the previously explained procedure.

Under those circumstances, in order to eliminate the effect of the jammer at the pick-up level of the main antenna 5 we will add on the involved secondary lobe of the main antenna (located at β-α of the main lobe) a secondary lobe with an opposing exact amplitude derived from the auxiliary antenna 6 after an appropriate modulation of the amplitude for that lobe. Elimination can thus take place since the jamming signals which are picked up by the auxiliary antenna and the opposing ones by the auxiliary antenna are coherent since they come from the same jammer.

Figure 8:
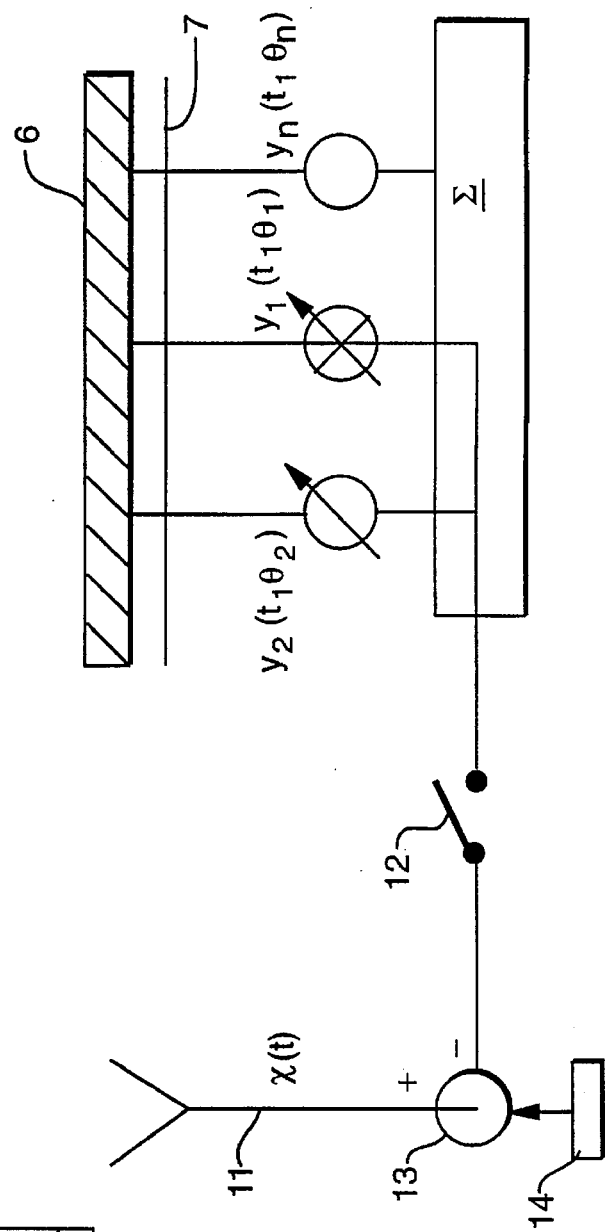
FIG. 8 displays schematically how the signal adding procedure takes place between the main antenna and the auxiliary antenna for the purpose of eliminating the jamming effects of various jammers.

The signal adding method through opposition is performed according to the scheme illustrated in FIG. 8.

As represented by main signal 11, the main antenna picks up the signal jammed in the determined θ direction. Jamming stems from the then high level of the corresponding secondary lobe of the main antenna in that direction.

Then, from the auxiliary antenna 6, we derive a modulated amplitude signal y1 (t1, θ1) which we direct and add with an electronic switch 12 of which we then control the closing at the level of the adder 13 with the main signal 11. Signal y1 is opposed to signal x of the main antenna and the amplitude of signal y1 is modulated up to the level needed to eliminate the signal from the main antenna for that angle. Therefore, we perform an opposition procedure for the secondary lobes from both patterns of the main antenna and the secondary antenna. We determine at the level of a noise measuring device 14 the time at which the modulation of the amplitude of the anti-jamming signal is adequate for the reduction of noise in the concerned direction. There too, all those procedures take place very rapidly in about several hundred nanoseconds.

One significant advantage of the invention is that, if several jammers are sensed in directions θ2, θ3, etc., it is possible to repeat the above described procedure by simply superimposing the anti-jamming signals with the pick-up signals from the main antenna, with a minimal weakening of the pick-up pattern of the main antenna.

EXAMPLES OF ASSEMBLY

We associate an auxiliary antenna to an electronic sweep antenna with a surface of 1.20 m×1.20 m that operates in the X band which is comprised of a flat antenna with slits, with a single pulse track in the azimuth plane in front of which a panel is installed which acts as a space filter as described above.

In this example, polarization is directed vertically. The overall size of the auxiliary antenna and of its noise pick-up is 1.20 m×20 cm×10 cm; the widths of the beam in the azimuth are 2,3 degrees and on site 12 degrees, thus covering the entire useful area; the first secondary lobes are at 30 dB, the antenna gain being 30 dB.

The peak lobes of the electronic sweep antenna are between 40 and 30 dB.

Since the panel dynamics are equal to 15 dB, the auxiliary antenna substantially ensures the cover for the lobes of the electronic sweep antenna.

Usually, if there is no jamming, the auxiliary antenna performs a continuous and periodic sweep of the area by shifting the symmetrical overintensification lobes through alteration of the period according to the law:

$$\theta = \text{Ark sin } \lambda/T(t) \quad (4)$$

Since the noise analysis is not at this quantitative stage, the system operates only under alarm; the analysis is performed on filters which correspond to weak analytical times; as an illustration, the sweeping speed of the overintensification lobe along the entire plane can equal about 100 ns/°

During jamming, when the alarm is triggered, the auxiliary antenna operates in the tracking mode. It localizes accurately the jammers by associating with the overintensification lobes the associated differential tracks.

Once the jammers are detected, the antenna performs the analysis of the jammers' noise parameters: intensity, frequency, period, etc.

In the presence of several strong jammers, the analysis can be performed by periodically switching on each of the jammers, or still by amplitude modulating each sinusoid at different frequencies, in order to sense each jammer within filters which do not intersect.

Since the noise parameters are known, we proceed with the cancellation at the level of the pick-up signal from the main antenna by adjusting the amplitudes and the phases of the overintensification lobes of the secondary antenna in order for them to become in opposition with the lobes of the main antenna as schematically shown in FIG. 8.

I claim:

1. A method of searching and assessing the position of at least one jammer transmitting towards a radar antenna, the pointing axis of the radar antenna being shifted in relation to the straight line connecting the antenna to the jammer, the method comprising the steps of:

placing a filter in front of the antenna, the filter including at least one network of conductive wires having added thereto appropriately arranged and distributed diodes for enabling modulation in response to the amplitude of secondary lobes from the radiation pattern of the antenna;

modulating currents traveling through the wires for shifting at least one overintensification by increasing by at least 10 to 15 decibles the level of one secondary lobe angularly distant by angle θ to the aiming direction of the antenna;

assessing and noting at all times the value of angle θ, angle θ being a function of the modulated currents applied to the network;

assessing and noting the noise level picked up by the antenna for each value of angle θ; and deducing the direction of the jammer from the pick-up peak noise levels.

2. The method according to claim 1, further comprising the steps of:

associating a second antenna to the radar antenna, the second antenna including a pick-up circuit;

adding at the level of the pick-up circuit pick-up signals derived from the radar antenna and modulated by the filter for substantially cancelling within the pick-up pattern of the second antenna the secondary lobes corresponding to the angle θ of the jammer set by the radar antenna, thereby eliminating the jamming effect on the second antenna.

3. In the event that multiple jammers are sensed, the method according to claim 2, further comprising the steps of:

independently adding, for each jammer, appropriate modulated signals derived from the radar antenna, for each sensed jammer the respective modulated signals corresponding to a respective angle θ for significantly cancelling the the pick-up pattern of the second antenna the secondary lobes of the corresponding jammer.

4. The method according to claim 2 or 3, further comprising the steps of:

using the radar antenna as an auxiliary antenna for searching and assessing the jammers; and independently using the second antenna as a main antenna for surveilling space.

5. Apparatus for searching and assessing the position of at least one transmitting jammer comprising:

a first radar antenna having a pointing axis shifted in relation to the straight line connecting the antenna to the jammer;

a filter placed in front of the first antenna, the filter including at least one network of conductive wires having added thereon appropriately arranged and distributed diodes for enabling modulation in response to the amplitude of secondary lobes from the radiation pattern of the first antenna;

a second main radar antenna including a pick-up circuit; and adding means for adding, at the level of signals picked up by the main antenna, modulated pick-up signals derived from the auxiliary antenna; thereby eliminating jamming effect on the main antenna.

6. Apparatus according to claim 5, further comprising:

noise measuring means for determining the times when the secondary lobes in the direction of the jammer are substantially cancelled and for subsequently monitoring the required modulation at the level of the filter.

* * * * *